United States Patent [19]
Goss et al.

[11] Patent Number: 5,836,263
[45] Date of Patent: Nov. 17, 1998

[54] CLUMPING ANIMAL LITTER

[75] Inventors: G. Robert Goss, Quincy; D. Cristina Frugoli, Mundelein, both of Ill.

[73] Assignee: Oil-Dri Corporation of America, Chicago, Ill.

[21] Appl. No.: 917,048

[22] Filed: Aug. 19, 1997

[51] Int. Cl.$^6$ ................................................. A01K 1/015
[52] U.S. Cl. ........................................................ 119/173
[58] Field of Search .................................. 119/173, 172, 119/171

[56] References Cited

U.S. PATENT DOCUMENTS

| | | | |
|---|---|---|---|
| Re. 33,983 | 7/1992 | Hughes | 119/173 |
| 3,586,478 | 6/1971 | Neumann | 23/111 |
| 5,094,189 | 3/1992 | Aylen et al. | 119/173 |
| 5,129,365 | 7/1992 | Hughes | 119/173 |
| 5,176,107 | 1/1993 | Buschur et al. | 119/173 |
| 5,188,064 | 2/1993 | House | 119/172 |
| 5,193,489 | 3/1993 | Hardin | 119/173 |
| 5,317,990 | 6/1994 | Hughes | 119/173 |
| 5,339,769 | 8/1994 | Toth et al. | 119/173 |
| 5,359,961 | 11/1994 | Goss et al. | 119/173 |
| 5,386,803 | 2/1995 | Hughes | 119/173 |
| 5,452,684 | 9/1995 | Elazier-Davis et al. | 119/173 |
| 5,458,091 | 10/1995 | Pattengill et al. | 119/173 |
| 5,503,111 | 4/1996 | Hughes | 119/173 |
| 5,529,022 | 6/1996 | Nelson | 119/173 |
| 5,542,374 | 8/1996 | Palmer, Jr. | 119/173 |
| 5,577,463 | 11/1996 | Elazier-Davis et al. | 119/173 |
| 5,634,431 | 6/1997 | Reddy et al. | 119/173 |
| 5,648,306 | 7/1997 | Hahn et al. | 502/80 |

FOREIGN PATENT DOCUMENTS 0378421A   7/1990   European Pat. Off. ....... A01K 1/015

*Primary Examiner*—Thomas Price
*Attorney, Agent, or Firm*—Olson & Hierl, Ltd.

[57] ABSTRACT

An improved, fast-clumping animal litter which substantially immediately upon wetting with aqueous liquid forms a clump of durable clump strength for removal from the unwetted litter substantially immediately or within hours. The inventive animal litter includes particulate non-swelling clay, swelling clay and starch. A preferred animal litter utilizes pregelatinized corn starch at relatively low amount which surprisingly permits decreasing the amount of swelling clay below the minimum amount conventionally required for autogenous clumping clay litters.

14 Claims, No Drawings

5,836,263

CLUMPING ANIMAL LITTER

TECHNICAL FIELD

This invention relates to animal litter compositions and in particular to fast-clumping animal litter compositions.

BACKGROUND OF THE INVENTION

Clay particles have long been used for providing small animals with dry, sanitary, dustless and relatively odorless litter. In particular, a free-flowing animal litter which quickly forms durable clumps when wetted with an aqueous liquid such as animal urine is desired. Clumps of wetted litter permit easy and selective removal of odor-producing animal wastes for convenient disposal without having to replace the entire litter bed.

Swelling clays have long been recognized as one means of facilitating separation and removal of urine-soaked clay particles from an otherwise fresh bed of animal litter. Swelling clays expand in volume and become tacky when wetted, forming clumps of spent clay which can be individually removed from the bed. U.S. Pat. No. Re. 33,983 and U.S. Pat. No. 5,503,111 to Hughes, each describe a method and composition for absorbing animal dross using at least about 65% by weight of water-swellable bentonite clay.

The swelling clay, upon contact with water, typically expands to ten or more times its original dry volume. This presents a problem with disposal where the animal owner disposes of the wetted litter down a domestic plumbing system. If not completely loaded with animal urine at the time of disposal, the swelling clay will continue to expand when contacted with additional liquids as, for example, within a household toilet plumbing system. During a period of continued swelling, the swelling clay has a propensity for becoming lodged within any recess, nook, or cranny, where it may otherwise have only temporarily come to rest.

This shortcoming of the swelling clay is compounded by a tacky surface texture which often accompanies the swelling of the clay. Further, because the swelling clay is an inorganic material that is not subject to biodegradation, a deposit of the swelling clay once lodged will tend to persist and accumulate more deposits. Over a period of time, the household plumbing system in which they are lodged may become blocked.

At least partly to avoid the plumbing blockages associated with the swelling clays, clumping agents have been devised which, when added to a bed containing non-swelling clay particles, cause the particles to clump together into an agglomeration of sufficient size and strength to be removed by a sieving spoon. Some prior art clumping agents include inorganic salts, such as anhydrous sodium sulfate, gypsum and the like, but these materials do not naturally degrade, can form insoluble hard water salts in household waste systems and thus are environmentally unacceptable.

Other clumping agents used in the prior art include polysaccharides, water-soluble gums, dry particulate cellulosic ethers and water-absorbent polymers. However, these additives require careful handling during manufacture, multiple processing steps and are costly. Further, in such animal litter, the dry particulate cellulosic ethers or the water-absorbent polymers tend to segregate from the particulate clay during handling and shipping.

Animals may ingest some of the animal litter while grooming. Therefore, it is important that all of the components of the animal litter be safe for animal consumption. This is especially true for animal litter which will be used by household pets and may occasionally be spilled or tracked about a floor of a home.

Some prior attempts also have been made to overcome the shortcomings of swelling clays by utilizing non-swelling clay and starch as a binder, but such litters were slow clumping. For example, U.S. Pat. No. 5,094,189 to Aylen et al., describes a sorbent, non-swelling clay mixed with 0.2 to 2% pregelatinized, cationic starch binder but adhesion of the wetted agglomerates was fairly light and required a day or so to become fairly firm. Likewise, U.S. Pat. No. 5,176,107 to Buschur describes a sorbent, non-swelling clay litter composition utilizing 8 to 14% wheat starch paste as a liquid-activated adhesive binding agent which required several hours for the wetted clumps to harden fully. The inability to rapidly remove wetted clumps of animal waste to reduce or eliminate malodors associated therewith from the litter is undesirable.

There is still a need and desire, therefore, for a fast-clumping animal litter that can be periodically disposed through a household plumbing system without fouling the system or creating an environmental nuisance. The components of the animal litter should not be so moisture sensitive as to be triggered by water vapor which is always present in the atmosphere, and should not separate from the particulate clay during handling, yet should respond substantially immediately upon contact with excreted aqueous body fluids. A desirable fast-clumping animal litter forms wetted clumps firm enough for separation and disposal within about a minute, hold together and remain durable for a period of at least a day or two, rather than weaken or disintegrate over time.

The fast-clumping animal litter of this invention satisfies this need.

SUMMARY OF THE INVENTION

The present invention provides an improved, fast-clumping animal litter composition which substantially immediately forms agglomerates upon contact with relatively small amounts of an aqueous liquid, such as water, urine or other aqueous body fluids. The inventive animal litter comprises an intimate admixture of free-flowing non-swelling clay, swelling clay, and starch.

Surprisingly, the inventive animal litter composition autogenously clumps in less than one minute when wetted by aqueous liquid to form substantially durable clumps without requiring additional clumping agents. Further, fast-clumping was achieved with relatively low concentration of starch and concentrations of swelling clay below the minimum required amounts conventionally utilized for achieving clumping in prior art litters. The inventive litter formed durable clumps of sufficient structural strength and integrity which allowed removal of the wetted clumps from the unwetted litter substantially immediately or within 24 to 48 hours for disposal.

A preferred improved fast-clumping litter contains, calculated on a total litter weight bases, swelling clay in an amount of at least about 30% by weight and starch, preferably pregelatinized corn starch, in an amount in the range of about 0.5 to about 6% by weight, with the remainder being non-swelling clay.

An advantage of reducing the swelling clay content below that conventionally used is that plumbing problems are correspondingly decreased, or overcome, if the animal's care giver decides to dispose of the wetted clumps through the household sanitary server system.

Another major advantage is that the composition on dispersing upon disposal, in large quantities of water as in a sanitary system or in the environment, produces end products that are all natural materials that are environmentally acceptable. Further, all of the constituents of the animal litter are substantially non-toxic to the animal and its handler.

DESCRIPTION OF THE PREFERRED EMBODIMENTS

The fast-clumping animal litter of this invention is in the form of a free-flowing admixture of particulate non-swelling clay, swelling clay and starch. The term "fast-clumping" as used herein means that the litter forms a clump of durable clump strength substantially immediately, i.e., within about 30 seconds to about one minute, of being wetted with an aqueous liquid, such as water or animal urine. The term "durable clump strength" as used herein means that such a so-formed wetted clump has a firmness of sufficient structural integrity and hardness to withstand mechanical separation from the unwetted litter for disposal substantially immediately, i.e., within about 30 seconds to about one minute of being wetted and retains such firmness for a period of at least 24 hours. Clump strength can be evaluated objectively or subjectively by any number of conventional methods known in the animal litter arts.

The animal litter of the present invention is eminently well suited for the containment of aqueous body fluids excreted or spilled by small animals. Such liquids include any aqueous liquid which may be excreted or regurgitated by the animal, as well as spilled foodstuffs or blood. The present invention is particularly useful as litter for household cats, but the scope of the invention itself is not so limited.

The non-swelling clay is an earthy material composed primarily of hydrous aluminum silicates and is different from the swelling clays that are capable of absorbing several times their weight of an aqueous liquid. Relatively small amounts of non-clay materials can also be present. The non-swelling clay is usually derived from a naturally occurring raw material, but synthetic non-swelling clays are also suitable. A clay which is particularly useful in practicing the present invention is a non-swelling smectite, i.e., a clay composed of units constituted by two silica tetrahedral sheets with a central alumina octahedral sheet. See, for example, Grim, 2nd ed., McGraw-Hill, Inc., New York, N.Y. (1968). pp 77–78. Smectite-attapulgite mixtures can also be used for this purpose.

It is common for individual clay particles to change in volume to some extent when absorbing an aqueous liquid. Typically, the "non-swelling" clays only expand so that a fully hydrated clay particle occupies less than about 150% of the volume that the particle occupied in an anhydrous state.

In contrast, the swelling clays are capable of expanding more than 500% during hydration. A swelling clay is defined in the literature and in patents, such as in U.S. Pat. No. 3,586,478, as one which gives a Bingham Yield Value of at least 20 dynes/cm$^2$ as a 2% dispersion in water.

An example of a well known swelling clay is sodium bentonite, also called Wyoming bentonite. That particular clay is commonly utilized as an oil-well drilling mud because of its propensity to swell and absorb large volumes of water. In a hydrated state, swelling clays often exhibit a tackiness which will cause adjacent particles of the swelling clay to agglomerate.

The non-swelling clay utilized in the litter compositions of the present invention expands minimally while travelling along a plumbing system for disposal, thus plugging of the plumbing system is not likely.

Smectites are particularly well suited as the particulate non-swelling clay constituent for the present purposes. The smectite family of clays includes the various mineral species montmorillonite, nontronite, hectorite and saponite, all of which can be present in the clay mineral in varying amounts. These clays can range in color from a cream or grey off-white to a dark reddish tan color. Such smectites are frequently referred to in the trade under designations as Mississippi Grey, Mississippi Tan, Blue Mountain, and Georgia White. These clays contain calcium and/or magnesium in the form of exchangeable cations.

The clay constituent of the present compositions is in the form of discrete particles. These particles preferably are rounded in shape to facilitate bagging and handling, and have surfaces that are reasonably smooth to the touch so that an animal feels comfortable standing upon them. Although particle sizes up to about 1 inch are suitable, a preferred size of clay particles is in the range of about 4 by about 60 mesh, U.S. Sieve Series. For a tabulation of U.S. Sieve Series screen nomenclature, see *Perry's Chemical Engineering Handbook,* 6th Ed., McGraw-Hill, Inc., New York, N.Y. (1984), p21–15 (table 21-6). An especially preferred size range for the clay particles in the present invention is the range of about 18 to about 60 mesh.

Within the preferred particle size ranges, the clay particle size can be manipulated as a means of modulating the contours of the clump that is produced upon contact with an aqueous liquid. Relatively flatter, thinner clumps are more easily located by probing the animal litter with, for example, a sieving spoon than are spheroidal clumps of similar volume. On the other hand, thinner clumps are more subject to breakage. The particle size distribution of the clay particles may therefore be tailored to a preference held by a particular group of consumers. For relatively thinner, flatter clumps, a particle size of about 20 mesh by 60 mesh, U.S. Sieve Series, is preferred. On the other hand, for relatively heavier, spheroidal clumps, a relatively coarser particle size in the range of about 4 by 20 mesh, U.S. Sieve Series, is preferred. In the present invention, the size range of the swelling clay preferably is in the range of about 16 to about 50 and for the non-swelling clay preferably is in the range of about 18 to about 60 mesh.

The starch can be obtained from any natural cereal, root or pith source. Preferably, the starch is pregelatinized corn starch, but is not limited thereto. The starch can be admixed with the clay constituents of the animal litter as by dry blending to form an intimate, homogeneous free-flowing admixture utilizing conventional dry blender equipment.

Upon contact with an appropriate amount of an aqueous liquid, the inventive animal litter of this invention autogenously forms a clump of durable clump strength within a matter of seconds. The so-formed durable clump is sufficiently durable for mechanical separation and removal from a bed of otherwise substantially dry animal litter. The formed clump also remains substantially intact and durable for at least a day. Thus, the inventive animal litter of this invention provides the animal's owner with an opportunity to remove and dispose of the clump either substantially immediately or at a later time.

A preferred improved fast-clumping litter of this invention contains, calculated on a total litter weight bases, swelling clay, preferably a low density grade sodium bentonite, in an amount of at least about 30% by weight; starch, preferably pregelatinized corn starch, in an amount in the range of about 0.5 to about 6% by weight; and non-swelling clay making up the remainder.

A particularly preferred animal litter contains on a total litter weight basis, contains:

a) sodium bentonite in an amount in the range of at least 30% by weight to not more than about 60% by weight;

b) pregelatinized corn starch in an amount in the range of about 0.5% to about 6% by weight, more preferably in an amount of about 0.75% to about 3% by weight, most preferably about 1% by weight; and c) non-swelling clay of the smectite group of clays making up the remainder of the litter.

It was surprisingly found that optimum, fast-clumping was autogenously achieved with the inventive animal litter at concentrations of starch that are relatively low that were not achieved in prior art starch containing litter. Further, fast-clumping was achieved with concentrations of swelling clay below the minimum amounts conventionally required for prior art swelling clay litter.

In the animal litter containing sodium bentonite, pregelatinized corn starch and non-swelling clay, no benefit in fast-clumping was achieved by increasing the increasing the sodium bentonite above about 60% by weight of the litter. Reducing the sodium bentonite to below about 30% by weight of the litter resulted in substantially slower formation of durable clumps. No benefit was seen in increasing the concentration of the starch above about 6% by weight. As the starch content increases, the starch tends to segregate out of the admixture and the firmness of the clumps diminishes.

In the absence of sodium bentonite, animal litter containing non-swelling clay and pregelatinized corn starch was slow clumping, requiring increasing the concentration of the starch to at least above about 4% by weight of the litter. However, as is known from the prior art increasing the starch in a non-swelling clay litter can result in formation of clumps that are too weak structurally for separation and disposal.

The present invention is further illustrated by the following Examples 1–68.

EXAMPLES 1–37

Examples 1–37 illustrate litter formulations containing Georgia clay as the non-swelling clay, sodium bentonite as the swelling clay and pregelatinized corn starch in the amounts indicated in the Table below. Examples 1–7 are litters containing swelling and non-swelling clay mixtures and no starch; Examples 8, 13, 19, 24, 29, and 34–37 are litters containing starch and non-swelling clay and Examples 9–12, 14–18, 20–23, 25–28, and 30–33 are litters of this invention containing swelling and non-swelling clay and pregelatinized starch.

In each of Examples nos. 1–37, the indicated animal litter was prepared by dry blending together on a weight basis the constituents and the various amounts listed in the Table below until the animal litter was substantially homogeneous and free-flowing.

Each litter formulation was then separately tested for clumping. To form clumps, water (about 20 ml) was poured onto the animal litter. Water was used for convenience, since experience has shown that clumps can be formed using water, which are approximately the same size as those formed by cat urine of substantially similar volume. The litter formulation was judged fast clumping if a clump of durable clump strength formed within about 30 seconds of water wetting and retained durable clump strength for a period in the range of about 1 to about 24 hours.

Durable clump strength (i.e., the structural integrity of the formed clump to withstand mechanical separation from the unwetted litter for disposal) was determined after about 30 seconds of water wetting, after about 1 hour after water wetting, and after about 24 hours after water wetting.

Clump strength was rated on a scale of 1 to 5 (1 being highest, 5 being lowest) by observing how well the formed clump retained its structural integrity when it was removed from the remaining unwetted (unclumped) portion of the litter and dropped from a vertical height of about 1 foot onto a substantially solid surface.

A clump was given a clump strength rating of 1 when it remained substantially intact on being dropped and given a clump strength rating of 5 when it completely fell apart on being dropped. The wetted clump was judged durable if it received a rating of not more than about 2.5, preferably not more than about 2, and most preferably about 1, within 30 seconds of wetting and retained a clump strength rating of not more than about 2, more preferably about 1 after about 24 hours and the litter from which such a clump was formed was judged as fast clumping.

EXAMPLES 1–37

| Ex. | % Starch (a) | % Swelling Clay (b) | % Georgia Clay | Clump Strength 30 sec | 1 hr | 24 hr |
|---|---|---|---|---|---|---|
| 1 |  | 0 | 100 | 5.0 | 5.0 | 5.0 |
| 2 |  | 10 | 90 | 4.7 | 5.0 | 5.0 |
| 3 |  | 20 | 80 | 3.3 | 4.3 | 4.7 |
| 4 |  | 30 | 70 | 3.3 | 2.3 | 2.7 |
| 5 |  | 40 | 60 | 1.7 | 1.7 | 1.7 |
| 6 |  | 50 | 50 | 1.3 | 1.3 | 1.0 |
| 7 |  | 60 | 40 | 1.0 | 1.0 | 1.0 |
| 8 | 0.5 |  | 100 | 5.0 | 5.0 | 3.3 |
| 9 | 0.5 | 30 | 70 | 2.3 | 1.3 | 1.0 |
| 10 | 0.5 | 40 | 60 | 1.7 | 1.0 | 1.0 |
| 11 | 0.5 | 50 | 50 | 1.0 | 1.0 | 1.0 |
| 12 | 0.5 | 60 | 40 | 1.0 | 1.0 | 1.0 |
| 13 | 1.0 |  | 100 | 5.0 | 5.0 | 2.3 |
| 14 | 1.0 | 15 | 85 | 4.3 | 4.3 | 2.7 |
| 15 | 1.0 | 30 | 70 | 1.7 | 1.7 | 1.0 |
| 16 | 1.0 | 40 | 60 | 1.0 | 1.0 | 1.0 |
| 17 | 1.0 | 50 | 50 | 1.0 | 1.0 | 1.0 |
| 18 | 1.0 | 60 | 40 | 1.0 | 1.0 | 1.0 |
| 19 | 1.5 |  | 100 | 4.7 | 4.7 | 1.7 |
| 20 | 1.5 | 30 | 70 | 1.7 | 1.0 | 1.0 |
| 21 | 1.5 | 40 | 60 | 1.0 | 1.0 | 1.0 |
| 22 | 1.5 | 50 | 50 | 1.0 | 1.0 | 1.0 |
| 23 | 1.5 | 60 | 40 | 1.0 | 1.0 | 1.0 |
| 24 | 2.0 |  | 100 | 2.3 | 3.7 | 2.0 |
| 25 | 2.0 | 30 | 70 | 1.0 | 1.3 | 1.0 |
| 26 | 2.0 | 40 | 60 | 1.0 | 1.0 | 1.0 |
| 27 | 2.0 | 50 | 50 | 1.0 | 1.0 | 1.0 |
| 28 | 2.0 | 60 | 40 | 1.0 | 1.0 | 1.0 |
| 29 | 2.5 |  | 100 | 2.3 | 2.7 | 1.3 |
| 30 | 2.5 | 30 | 70 | 1.0 | 1.3 | 1.0 |
| 31 | 2.5 | 40 | 60 | 1.0 | 1.0 | 1.0 |
| 32 | 2.5 | 50 | 50 | 1.0 | 1.0 | 1.0 |
| 33 | 2.5 | 60 | 40 | 1.0 | 1.0 | 1.0 |
| 34 | 3.0 |  | 100 | 2.0 | 2.7 | 1.0 |
| 35 | 4.0 |  | 100 | 1.7 | 2.0 | 1.0 |
| 36 | 5.0 |  | 100 | 1.7 | 2.0 | 1.0 |
| 37 | 6.0 |  | 100 | 1.3 | 1.3 | 1.0 |

(a) Pregelatinized corn starch (AMERIKOR 818, ADM Milling/Kraus Milling, Shawnee Mission, KS)
(b) Sodium bentonite LD-16 (Bentonite Corp. of America, Denver, Co.)

The results show that the litter formulations of this invention containing non-swelling clay, swelling clay, and pregelatinized corn starch were fast-clumping, forming clumps of durable clump strength substantially immediately upon wetting. Substantially durable clumps formed within about 30 seconds after wetting when the amount of pregelatinized corn starch present in the litter was in the range of about 0.5% to about 3% by weight, based on the total weight of the litter formulation. The results also show that increasing the amount of swelling clay to above about 40% to about 60% by weight provided no further benefit. The litter of Example 18, in particular, showed minimal pooling of the liquid while also maintaining a hard clump.

Examples 14 and 15 illustrate that starch at a concentration of about 1% by weight and swelling clay in an amount of about 30% by weight in the litter provided a fast-clumping litter whereas decreasing the swelling clay content to about 15% provided no clumping benefit.

Formulations containing only pregelatinized corn starch and non-swelling clay were judged as not being fast clumping at concentrations of starch below about 2.5% by weight. At starch concentrations of about 3% by weight or more, the starch tends to segregate from the mixture.

EXAMPLES 38–68

Examples 38–68 illustrate litter formulations containing Blue Mountain clay as the non-swelling clay, sodium bentonite as the swelling clay and pregelatinized corn starch in the amounts indicated in the Table below. Examples 38–44 are litters containing swelling and non-swelling clay mixtures and no starch; Examples 45, 49, 55, and 66–68 are litters containing starch and non-swelling clay and Examples 46–48, 50–54, and 56–65 are litters of this invention containing swelling clay non-swelling clay and pregelatinized starch.

EXAMPLES 38–68

| Ex. | % Starch (a) | % Swelling Clay (b) | % Blue Mountain Clay | Clump Strength 30 sec | 1 hr | 24 hr |
|---|---|---|---|---|---|---|
| 38 |  | 0 | 100 | 5.0 | 4.7 | 4.7 |
| 39 |  | 10 | 90 | 3.0 | 4.3 | 5.0 |
| 40 |  | 20 | 80 | 2.7 | 4.0 | 4.7 |
| 41 |  | 30 | 70 | 2.3 | 2.3 | 3.7 |
| 42 |  | 40 | 60 | 1.0 | 1.3 | 2.0 |
| 43 |  | 50 | 50 | 1.0 | 1.0 | 1.3 |
| 44 |  | 60 | 40 | 1.0 | 1.0 | 1.0 |
| 45 | 0.5 |  | 100 | 5.0 | 5.0 | 4.3 |
| 46 | 0.5 | 30 | 70 | 2.3 | 3.3 | 1.7 |
| 47 | 0.5 | 40 | 60 | 1.0 | 1.3 | 1.0 |
| 48 | 0.5 | 60 | 40 | 1.0 | 1.0 | 1.0 |
| 49 | 1.0 |  | 100 | 4.3 | 5.0 | 2.0 |
| 50 | 1.0 | 15 | 85 | 4.3 | 3.7 | 2.7 |
| 51 | 1.0 | 30 | 70 | 1.7 | 1.7 | 1.3 |
| 52 | 1.0 | 40 | 60 | 1.0 | 1.0 | 1.0 |
| 53 | 1.0 | 50 | 50 | 1.0 | 1.0 | 1.0 |
| 54 | 1.0 | 60 | 40 | 1.0 | 1.0 | 1.0 |
| 55 | 1.5 |  | 100 | 4.0 | 5.0 | 1.3 |
| 56 | 1.5 | 30 | 70 | 1.0 | 1.0 | 1.0 |
| 57 | 1.5 | 40 | 60 | 1.0 | 1.3 | 1.0 |
| 58 | 1.5 | 50 | 50 | 1.0 | 1.0 | 1.0 |
| 59 | 1.5 | 60 | 40 | 1.0 | 1.0 | 1.0 |
| 60 | 2.0 | 30 | 70 | 1.0 | 1.7 | 1.0 |
| 61 | 2.0 | 40 | 60 | 1.0 | 1.0 | 1.0 |
| 62 | 2.0 | 50 | 50 | 1.0 | 1.0 | 1.0 |
| 63 | 2.0 | 60 | 40 | 1.0 | 1.0 | 1.0 |
| 64 | 2.5 | 30 | 70 | 1.0 | 1.0 | 1.0 |
| 65 | 2.5 | 40 | 60 | 1.0 | 1.0 | 1.0 |
| 66 | 4.0 |  | 100 | 2.3 | 2.7 | 1.0 |
| 67 | 5.0 |  | 100 | 2.0 | 1.7 | 1.0 |
| 68 | 6.0 |  | 100 | 1.3 | 1.7 | 1.0 |

(a) Pregelatinized corn starch (AMERIKOR 818, ADM Milling/Kraus Milling, Shawnee Mission, KS)
(b) Sodium bentonite LD-16 (Bentonite Corp. of America, Denver, Co.)

The results show that the litter formulations of this invention containing non-swelling clay, swelling clay, and pregelatinized corn starch were fast-clumping, forming clumps of durable clump strength substantially immediately upon wetting. Substantially durable clumps formed within about 30 seconds after wetting when the amount of pregelatinized corn starch present in the litter was in the range of about 0.5% to about 2.5% by weight, based on the total weight of the litter formulation. The results also show that increasing the amount of swelling clay to a range of above about 40% to about 60% by weight provided no further benefit. The litter of Example 54, in particular, showed minimal pooling of the liquid while maintaining a hard clump.

Examples 50 and 51 illustrate that starch at a concentration of about 1% by weight and swelling clay in an amount of about 30% by weight in the litter provided a fast-clumping litter whereas decreasing the swelling clay content to about 15% provided no clumping benefit.

Formulations containing only pregelatinized corn starch and non-swelling clay were judged as not being fast clumping at concentrations of starch below about 4% by weight.

The foregoing discussion and the accompanying examples are presented as illustrative, and are not to be taken as limiting. Still other variations within the spirit and scope of this invention are possible and will readily present themselves to those skilled in the art.

We claim:

1. A clumping animal litter comprising:

a particulate, non-swelling clay material;

a swelling clay; and starch;

said litter containing on a total litter weight basis, the swelling clay in an amount of at least about 30% by weight and starch in an amount in the range of about 0.5 to about 6% by weight.

2. The litter of claim 1 wherein the non-swelling clay material is smectite.

3. The litter of claim 1 wherein the non-swelling clay material has a particle size in the range of about 18 to about 60 mesh, U.S. Sieve Series.

4. The litter of claim 1 wherein the swelling clay is sodium bentonite.

5. The litter of claim 1 wherein the swelling clay material has a particle size in the range of about 16 to about 50 mesh, U.S. Sieve Series.

6. The litter of claim 1 wherein the swelling clay is in an amount of not more than about 60% by weight.

7. The litter of claim 1 wherein the starch is pregelatinized starch.

8. The litter of claim 1 wherein the starch is pregelatinized corn starch.

9. The litter of claim 1 wherein the starch is in an amount of about 0.75 to about 3% by weight of the litter.

10. The litter of claim 1 in packaged form.

11. An improved, fast-clumping animal litter comprising on a total litter weight basis:

a particulate, non-swelling clay material;

a swelling clay in an amount in the range of from about 30 to about 60% by weight of the litter; and starch in an amount in the range of from about 0.5 to about 6% by weight.

12. The litter of claim 11 wherein the swelling clay is sodium bentonite.

13. The litter of claim 11 wherein the starch is pregelatinized corn starch.

14. The litter of claim 11 wherein the starch is in an amount in the range of about 0.75 to about 3% by weight.

* * * * *